(12) United States Patent
Kuwabara

(10) Patent No.: US 10,780,936 B2
(45) Date of Patent: Sep. 22, 2020

(54) STRADDLE-TYPE VEHICLE

(71) Applicant: HONDA MOTOR CO., LTD., Minato-ku, Tokyo (JP)

(72) Inventor: Naoki Kuwabara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 16/003,194

(22) Filed: Jun. 8, 2018

(65) Prior Publication Data
US 2019/0023345 A1 Jan. 24, 2019

(30) Foreign Application Priority Data
Jul. 19, 2017 (JP) .................. 2017-140274

(51) Int. Cl.
| B62K 11/02 | (2006.01) |
| F16H 57/04 | (2010.01) |
| B62L 3/04 | (2006.01) |
| B62J 31/00 | (2006.01) |
| B62M 7/04 | (2006.01) |
| B62L 3/06 | (2006.01) |
| F01M 11/02 | (2006.01) |

(Continued)

(52) U.S. Cl.
CPC .............. B62K 11/02 (2013.01); B62J 31/00 (2013.01); B62L 3/04 (2013.01); B62L 3/06 (2013.01); B62M 7/04 (2013.01); F01M 11/02 (2013.01); F16H 57/0408 (2013.01); B62J 11/13 (2020.02); B62J 45/40 (2020.02); B62K 25/24 (2013.01); B62K 25/283 (2013.01)

(58) Field of Classification Search
CPC ... B62K 11/02; B62J 31/00; B62J 2099/0046; B62L 3/04; B62L 3/06; F01M 11/02; F01M 11/0408; F01M 11/0004; F01M 2011/0416; F01M 2011/0425
See application file for complete search history.

(56) References Cited

U.S. PATENT DOCUMENTS 3,103,947 A * 9/1963 Mueller ............. F01M 11/0408
137/351
4,702,339 A * 10/1987 Hayashi ................ B60T 8/3225
180/219

(Continued)

FOREIGN PATENT DOCUMENTS

| CN | 101525023 | 9/2009 |
| CN | 203461004 | 3/2014 |

(Continued)

OTHER PUBLICATIONS

Extended European Search Report for European Patent Application No. 18178678.1 dated Dec. 19, 2018.

(Continued)

Primary Examiner — Jacob D Knutson
Assistant Examiner — Michael R Stabley
(74) Attorney, Agent, or Firm — Amin, Turocy & Watson, LLP

(57) ABSTRACT

A straddle-type vehicle includes a drive unit used for driving a rear wheel of the straddle-type vehicle, wherein a discharge port that discharges oil in the drive unit is installed on a lower section of the drive unit, and a guide that guides oil to an outside in a vehicle width direction is installed in a vicinity of a lower section of the discharge port.

7 Claims, 8 Drawing Sheets

(51) Int. Cl.
*B62K 25/24* (2006.01)
*B62K 25/28* (2006.01)
*B62J 11/13* (2020.01)
*B62J 45/40* (2020.01)

(56) References Cited

U.S. PATENT DOCUMENTS

| | | | | |
|---|---|---|---|---|
| 4,977,978 | A * | 12/1990 | Batrice | F01M 11/0408 123/196 S |
| 5,074,379 | A * | 12/1991 | Batrice | F01M 11/0408 123/196 R |
| 5,228,536 | A | 7/1993 | Mohns | |
| 5,655,624 | A * | 8/1997 | Kelly, Jr. | F16N 31/002 184/1.5 |
| 5,857,503 | A * | 1/1999 | Vreeken | F01M 11/0408 141/1 |
| 7,156,067 | B1 * | 1/2007 | Gottschalk | B25B 27/0042 123/196 R |
| 8,181,745 | B1 * | 5/2012 | Stanfield | B62K 11/04 184/1.5 |
| 8,578,975 | B2 * | 11/2013 | Ernst | B67C 11/02 137/312 |
| 9,719,468 | B2 * | 8/2017 | Kakuk | F02B 75/00 |

FOREIGN PATENT DOCUMENTS

| | | |
|---|---|---|
| CN | 105460121 | 4/2016 |
| JP | 60-103757 | 7/1985 |
| JP | 61-059194 | 4/1986 |
| JP | 61-138810 | 6/1986 |
| JP | 62-046287 | 3/1987 |
| JP | 62-046288 | 3/1987 |
| JP | 2991756 | 12/1999 |
| JP | 2001-032914 | 2/2001 |
| JP | 3220410 | 10/2001 |
| JP | 2006-055118 | 3/2006 |
| JP | 2007-223539 | 9/2007 |

OTHER PUBLICATIONS

Japanese Office Action for Japanese Patent Application No. 2017-140274 dated Jan. 8, 2019.
Chinese Office Action for Chinese Patent Application No. 201810766614.9 dated Jan. 20, 2020.

* cited by examiner

STRADDLE-TYPE VEHICLE

CROSS-REFERENCE TO RELATED APPLICATION

Priority is claimed on Japanese Patent Application No. 2017-140274, filed Jul. 19, 2017, the content of which is incorporated herein by reference.

BACKGROUND OF THE INVENTION

Field of the Invention

The present invention relates to a straddle-type vehicle.

Description of Related Art

In the related art, for example, a drive unit for a vehicle as disclosed in Japanese Unexamined Patent Application, First Publication No. 2001-32914 is known. The drive unit for a vehicle includes a case in which oil for lubricating a speed reduction mechanism is contained.

SUMMARY OF THE INVENTION

Incidentally, when a discharge port for oil is formed in a lower section of the case, oil may not be directly dropped onto a ground surface due to a stopped situation (an inclined situation) of a vehicle depending on a position of the discharge port. When the oil cannot be directly dropped onto the ground surface, workability of oil exchange may be deteriorated.

An aspect of the present invention is to provide a straddle-type vehicle having a discharge port for oil in a lower section of a drive unit, and is directed to securely guiding oil to a ground surface.

(1) A straddle-type vehicle according to an aspect of the present invention includes a drive unit used for driving a driving wheel of the straddle-type vehicle, wherein a discharge port configured to discharge oil in the drive unit is installed on a lower section of the drive unit, and a guide configured to guide the oil to an outside in a vehicle width direction is installed in a vicinity of a lower section of the discharge port.

(2) In the aspect of the above mentioned (1), when seen in a bottom view, an opening section configured to open the discharge port downward may be formed in the guide.

(3) In the aspect of the above mentioned (1) or (2), the guide may be formed integrally with a support section that is able to support a cable body.

(4) In the aspect of the above mentioned (3), the guide may include: a forward-rearward extension section extending in a vehicle forward-rearward direction; an outward extension section extending outward from one end of the forward-rearward extension section in a vehicle width direction; and a downward extension section extending downward from an outer end of the outward extension section in the vehicle width direction.

(5) In the aspect of the above mentioned (4), the support section may include a support section main body configured to support the cable body further outward than the outward extension section in the vehicle width direction.

(6) In the aspect of any one of the above mentioned (3) to (5), the guide and the support section may be fixed to a drive unit case of the drive unit by a single fixing member, the guide may be disposed on one side with respect to the fixing member in the vehicle forward-rearward direction, and the support section may be disposed on the other side with respect to the fixing member in the vehicle forward-rearward direction.

(7) In the aspect of any one of the above mentioned (3) to (6), the straddle-type vehicle may further include a first brake caliper disposed in front of the discharge port and installed on the lower section of the drive unit; and a second brake caliper disposed behind the discharge port and installed on a rear section of the drive unit, wherein the support section supports a brake hose connected to the second brake caliper as the cable body.

(8) In the aspect of the above mentioned (7), the straddle-type vehicle may further include a wheel speed sensor installed behind the discharge port and in front of the second brake caliper and configured to detect a rotating speed of the driving wheel.

(9) In the aspect of any one of the above mentioned (1) to (8), when seen in a side view, the discharge port may be covered with the cable body.

According to the aspect of the above mentioned (1), since oil dropped from the discharge port is guided to the outside in the vehicle width direction by the guide as the guide configured to guide the oil to the outside in the vehicle width direction is installed in the vicinity of the lower section of the discharge port, oil in the straddle-type vehicle can be reliably guided to the ground surface.

According to the aspect of the above mentioned (2), when seen in the bottom view, since oil can be directly dropped onto the ground surface via the opening section as the opening section configured to open the discharge port downward is installed in the guide, the guide is preferably not contaminated. In addition, a material cost of the guide can be reduced by the opening section.

According to the aspect of the above mentioned (3), since the guide is formed integrally with the support section that can support the cable body, in comparison with the case in which the guide is installed separate from the support section, the number of parts can be reduced and costs can be minimized.

According to the aspect of the above mentioned (4), since the guide includes the forward-rearward extension section extending in the vehicle forward-rearward direction, the outward extension section extending outward from one end of the forward-rearward extension section in the vehicle width direction and the downward extension section extending downward from the outer end of the outward extension section in the vehicle width direction, when the oil dropped from the discharge port strikes the forward-rearward extension section, the oil is guided to the outside in the vehicle width direction by the outward extension section along the forward-rearward extension section and guided to the lower side along the downward extension section. Accordingly, the oil can be reliably guided to the ground surface along the forward-rearward extension section, the outward extension section and the downward extension section.

According to the aspect of the above mentioned (5), since the support section includes the support section main body that can support the cable body further outward than the outward extension section in the vehicle width direction, the cable body supported by the support section main body can be prevented from coming in contact with the outward extension section.

According to the aspect of the above mentioned (6), since the guide and the support section are fixed to the drive unit case by a single fixing member, the guide is disposed on one side with respect to the fixing member in the vehicle forward-rearward direction and the support section is disposed on the other side with respect to the fixing member in the vehicle forward-rearward direction, the guide and the support section can be fixed by the single fixing member with good balance in the forward-rearward direction. In addition, in comparison with the case in which the guide and the support section are fixed by a plurality of fixing members, the number of parts can be reduced and costs can be minimized.

According to the aspect of the above mentioned (7), since the first brake caliper disposed in front of the discharge port and installed on the lower section of the drive unit and the second brake caliper disposed behind the discharge port and installed on the rear section of the drive unit are further provided and the support section supports the brake hose connected to the second brake caliper as the cable body, the guide can be optimally disposed in the straddle-type vehicle in which the mounting space is limited.

According to the aspect of the above mentioned (8), since the wheel speed sensor installed behind the discharge port and in front of the second brake caliper and configured to detect a rotating speed of the driving wheel is further provided, the guide can be more optimally disposed in the straddle-type vehicle in which the mounting space is further limited.

According to the aspect of the above mentioned (9), when seen in the side view, since the discharge port is hidden as the discharge port is covered with the cable body, appearance characteristics can be improved.

DETAILED DESCRIPTION OF THE INVENTION

Figure 1:
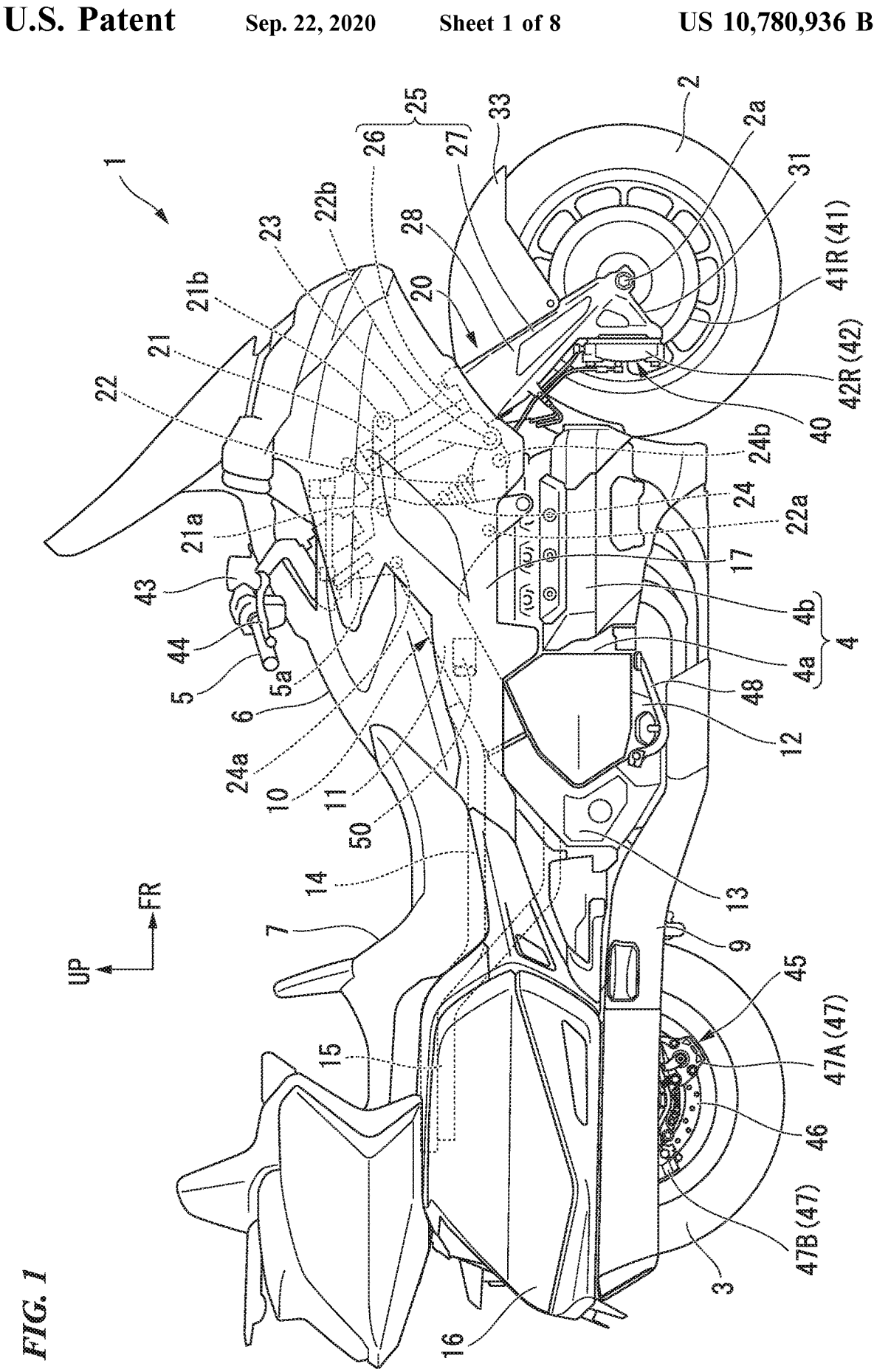
FIG. 1 is a right side view of a motorcycle according to an embodiment of the present invention.

Hereinafter, an embodiment of an aspect of the present invention will be described with reference to the accompanying drawings. Further, directions of forward-rearward, leftward, rightward, and the like in the following description are the same as directions in a vehicle which will be described below unless the context clearly indicates otherwise. In addition, in appropriate places in the drawings used in the following description, an arrow FR showing a forward direction with respect to a vehicle, an arrow LH showing a leftward direction with respect to a vehicle and an arrow UP showing an upward direction with respect to a vehicle are provided.

<Entire Vehicle>

FIG. 1 shows a large-sized motorcycle 1 including a horizontally opposed-six-cylinder engine 4 provided between a front wheel 2 and a rear wheel 3 as a straddle-type vehicle. Hereinafter, the motorcycle may be simply referred to as "a vehicle."

The engine 4 is supported by a vehicle body frame 10. The vehicle body frame 10 includes main frames 11 configured to pivotably support a handle steering shaft 5a pivoted by a handle 5, a lower frame 12 attached to front lower sections of the main frames 11 and extending forward and rearward below the main frames 11, a pair of left and right pivot plates 13 extending and crossing between rear end portions of the main frames 11 and the lower frame 12 in an upward/downward direction, a pair of left and right seat rails 14 extending rearward from the rear end portions of the main frames 11, and a pair of left and right sub frames 15 extending rearward and upward from the pivot plates 13 and coupled to rear end portions of the seat rails 14.

The engine 4 is disposed below the main frames 11. The engine 4 is supported by the main frames 11 and the lower frame 12. The engine 4 includes a crank case 4a, and left and right cylinders 4b protruding leftward and rightward from the crank case 4a. Three cylinder bores are formed in each of the left and right cylinders 4b in parallel in the forward-rearward direction, and pistons are slidably inserted into the cylinder bores.

A fuel tank 6 is disposed above the main frames 11. The fuel tank 6 extends from a front side toward a rear lower side along inclinations of the main frames 11. The fuel tank 6 is supported by the main frames 11. A seat 7 on which an occupant sits is disposed behind the fuel tank 6. The seat 7 is supported by the seat rails 14. An air cleaner box (not shown) is disposed between the left and right main frames 11 in a vehicle width direction and above the engine 4.

Figure 3:
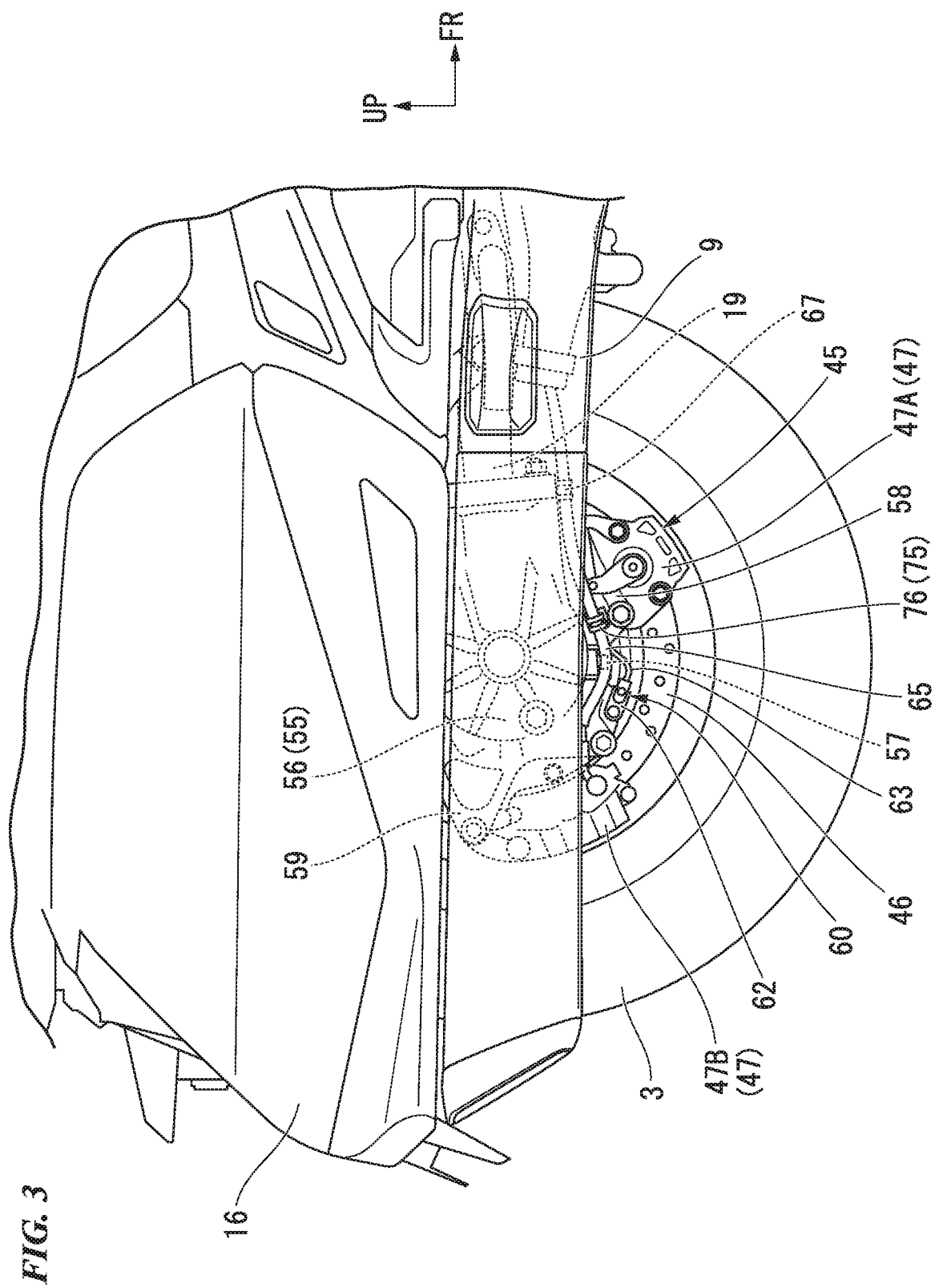
FIG. 3 is a right side view of the vehicle rear section of the motorcycle.
Figure 4:
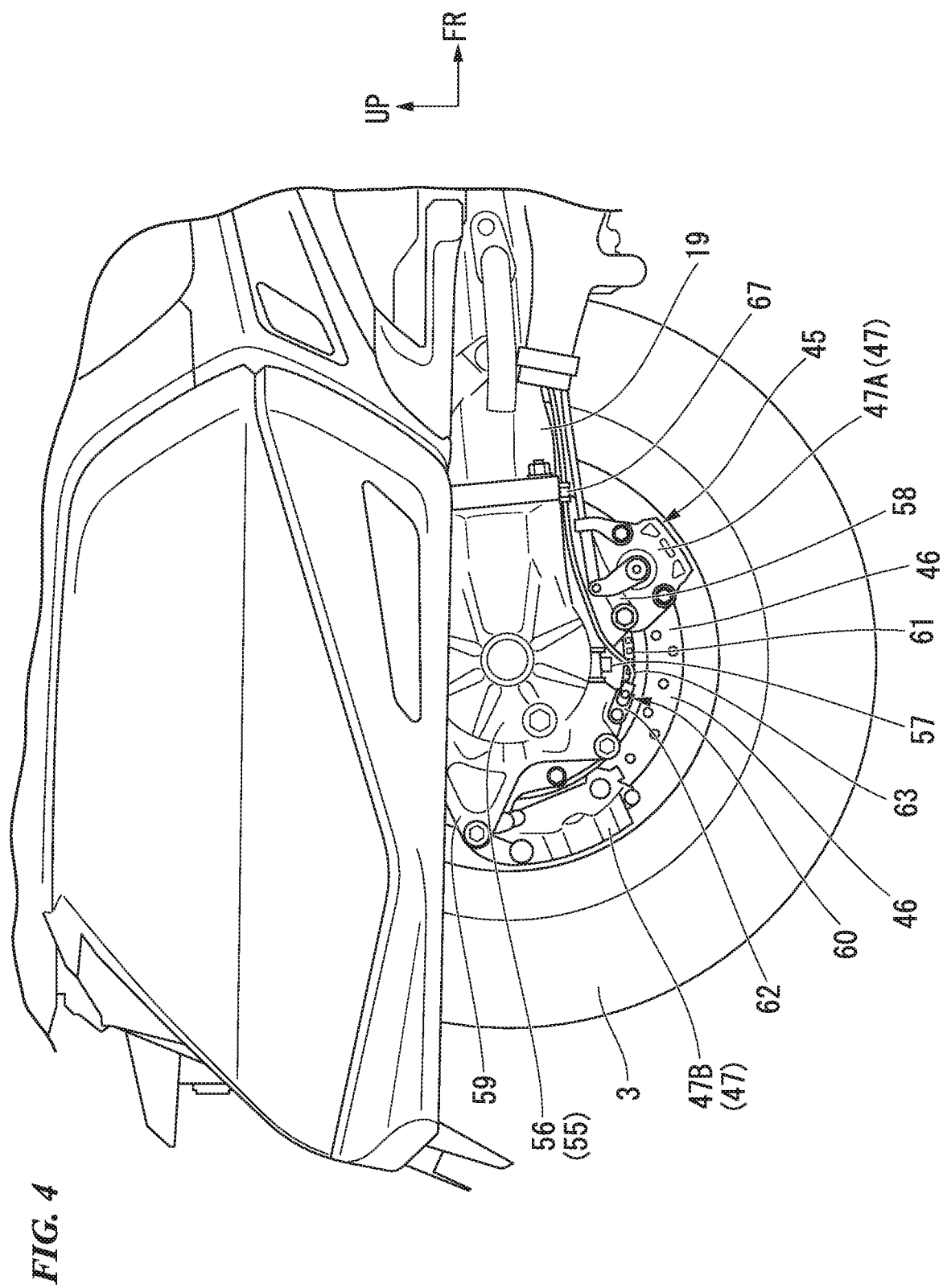
FIG. 4 is a right side view of a drive unit of the motorcycle.

A front end portion of a rear swing arm 19 (see FIG. 4) extending in the forward-rearward direction is rotatably supported by the pivot plates 13. The rear swing arm 19 is swingable in the upward/downward direction. As shown in FIG. 4, the rear wheel 3 is supported by a rear end portion (a drive unit 55) of the rear swing arm 19. The rear swing arm 19 is disposed at the vehicle width direction inner side of an exhaust muffler 9 (see FIG. 3) extending in the forward-rearward direction at a vehicle lower section. As shown in FIG. 1, left and right trunks 16 are installed on left and right sides of the rear wheel 3. Upper sides of the left and right cylinders 4b are covered with front side cowls 17 from the outside in the vehicle width direction.

<Drive Unit>

As shown in FIG. 4, the drive unit 55 used for driving the rear wheel 3 is installed on the rear swing arm 19. The drive unit 55 includes a speed reduction mechanism (not shown) including a driving gear, and a drive unit case 56 configured to accommodate oil for lubricating the speed reduction mechanism therein. A discharge port 57 for oil is installed in a lower section of the drive unit 55. A first rear caliper support section 58 is installed on the lower section of the drive unit 55.

A second rear caliper support section 59 is installed on a rear section of the drive unit 55.

<Front Suspension Mechanism>

As shown in FIG. 1, a front suspension mechanism 20 is supported by front sections of the main frames 11. The front suspension mechanism 20 includes an upper link 21, a lower link 22, a fork support section 23, a front cushion unit 24 and a front swing arm 25.

The upper link 21 and the lower link 22 are respectively disposed above and below the front sections of the main frames 11 with an interval interposed therebetween. The upper link 21 and the lower link 22 are vertically swingably supported by the front sections of the main frames 11 via support shafts 21*a* and 22*a*, respectively. The upper link 21 and the lower link 22 are disposed substantially in parallel while extending in the forward-rearward direction.

The fork support section 23 is inclined rearward while formed in a cylindrical shape. A front end portion of the upper link 21 is pivotably connected to an upper front section of the fork support section 23 via a support shaft 21*b*.

A front end portion of the lower link 22 is pivotably connected to a lower rear section of the fork support section 23 via a support shaft 22*b*.

An upper end portion of the front cushion unit 24 is swingably supported by the main frames 11 via a support shaft 24*a*. A lower end portion of the front cushion unit 24 is swingably supported by the lower link 22 via a support shaft 24*b*.

The front swing arm 25 is disposed so as to be inclined rearward. The front swing arm 25 includes a front wheel steering shaft 26 pivotably supported by the fork support section 23, and a fork section 27 integrally connected to a lower end portion of the front wheel steering shaft 26.

The front wheel steering shaft 26 is inserted through a fork shaft insertion hole formed in the fork support section 23. The front wheel steering shaft 26 is pivotably supported by the fork support section 23 while being inserted through the fork shaft insertion hole.

The fork section 27 includes a pair of left and right arm sections 28 extending upward and downward so as to be inclined rearward, and a bridge section (not shown) configured to integrally connect upper end portions of the left and right arm sections 28.

A front wheel axle 2*a* configured to rotatably support the front wheel 2 is attached to lower end portions of the left and right arm sections 28. A lower end portion of the front wheel steering shaft 26 is attached to the bridge section.

The arm sections 28 are formed in a tapered shape such that lower end portion sides are tapered. Front caliper support sections 31 are formed at rear sections of the lower end portions of the arm sections 28. A front fender 33 configured to cover an upper section of the front wheel 2 is attached to the arm sections 28.

<Front Brake Apparatus>

A disk type front brake apparatus 40 is installed on the side of the front wheel 2.

The front brake apparatus 40 includes a front disk brake 41 installed on an outer circumferential side of a hub of the front wheel 2 and rotated integrally with the front wheel 2, and a front brake caliper 42 configured to apply a frictional force to the front disk brake 41 upon braking (i.e., apply a braking force to the front wheel 2 with the front disk brake 41 sandwiched therebetween).

The front disk brake 41 includes an annular first front disk brake (not shown) attached to one side portion (a left side portion) of the hub of the front wheel 2 in the vehicle width direction, and an annular second front disk brake 41R attached to the other side portion (a right side portion) of the hub of the front wheel 2 in the vehicle width direction. The first front disk brake and the second front disk brake 41R are disposed concentrically with the front wheel 2.

The front brake caliper 42 includes a first front brake caliper (not shown) supported on one side of the front wheel 2 in the vehicle width direction (specifically, the front caliper support section 31 of the left arm section 28), and a second front brake caliper 42R supported on the other side of the front wheel 2 in the vehicle width direction (specifically, the front caliper support section 31 of the right arm section 28).

<Rear Brake Apparatus>

As shown in FIG. 4, a disk type rear brake apparatus 45 is installed on the side of the rear wheel 3. The rear brake apparatus 45 includes an annular rear disk brake 46 installed on an outer circumferential side of a hub of the rear wheel 3 and rotated integrally with the rear wheel 3, and a rear brake caliper 47 configured to apply a frictional force to the rear disk brake 46 upon braking (i.e., apply a braking force to the rear wheel 3 with the rear disk brake 46 sandwiched therebetween).

The rear disk brake 46 is attached to a right side portion of the hub of the rear wheel 3 in the vehicle width direction. The rear disk brake 46 forms an annular shape concentrically with the rear wheel 3.

The rear brake caliper 47 includes a first rear brake caliper 47A (a first brake caliper) disposed in front of the discharge port 57 and installed on a lower section of the drive unit 55, and a second rear brake caliper 47B (a second brake caliper) disposed behind the discharge port 57 and installed on a rear section of the drive unit 55.

The first rear brake caliper 47A is supported by the first rear caliper support section 58.

For example, the first rear brake caliper 47A is a mechanical brake caliper.

The second rear brake caliper 47B is supported by the second rear caliper support section 59.

For example, the second rear brake caliper 47B is a hydraulic brake caliper.

<Master Cylinder>

As shown in FIG. 1, a master cylinder 43 for a front wheel configured to supply a hydraulic pressure (a brake pressure) for clamping in the front brake caliper 42 is installed in the handle 5. A brake lever 44 is swingably supported by the handle 5. The master cylinder 43 for a front wheel supplies a brake pressure to the front brake caliper 42 according to an operation of the brake lever 44.

Although not shown, a master cylinder for a rear wheel configured to supply a brake pressure (a hydraulic pressure to the second rear brake caliper 47B) for clamping in the rear brake caliper 47 is installed on the right pivot plate 13. As shown in FIG. 1, a brake pedal 48 is swingably supported by the right pivot plate 13. The master cylinder for a rear wheel supplies a brake pressure to the rear brake caliper 47 according to an operation of the brake pedal 48.

<Antilock Brake System (ABS) Module>

An ABS module 50 is installed between the left and right main frames 11 in the vehicle width direction.

When seen in a side view, the ABS module 50 is disposed above the left and right cylinders 4*b* of the engine 4 at a predetermined interval. The ABS module 50 is supported by inner side sections of the main frames 11 in the vehicle width direction via a bracket (not shown).

The master cylinder 43 for a front wheel is configured to supply a brake pressure to the front brake caliper 42 via the ABS module 50. In addition, the master cylinder for a rear wheel (not shown) is configured to supply a brake pressure to the rear brake caliper 47 via the ABS module 50. That is, in the motorcycle 1, the ABS module 50 is installed in the middle of a piping that connects the front brake caliper 42 and the master cylinder 43 for a front wheel. Also, the ABS module 50 is disposed in the middle of a piping that connects the rear brake caliper 47 and the master cylinder for a rear wheel (not shown).

The ABS module 50 can reduce a brake pressure to the front brake caliper 42 and the rear brake caliper 47 to prevent a slippage (locking) when a slippage (locking) is detected upon braking of the front wheel 2 and the rear wheel 3. For example, the ABS module 50 performs control such that a brake pressure to the front brake caliper 42 and the rear brake caliper 47 is intermittent when the slippage (locking) is detected.

Although not shown, the ABS module 50 includes an electronic control part, a hydraulic circuit unit and an electric motor. For example, in the ABS module 50, when the slippage (locking) is detected, a pressure reduction control signal is input to an electronic control part, the electronic control part drives an electric motor and controls a valve in a hydraulic circuit unit, and thus, a brake pressure is controlled to be intermittent by reducing the pressure.

<Wheel Speed Detection Apparatus>

As shown in FIG. 4, a wheel speed detection apparatus 60 configured to detect a rotating speed of the rear wheel 3 is installed on the side of the rear wheel 3. The wheel speed detection apparatus 60 includes an annular pulser ring 61 that rotates integrally with the rear wheel 3, and a pickup sensor 62 (a wheel speed sensor) configured to detect the rotation of the pulser ring 61.

The pulser ring 61 is attached to the right side portion of the hub of the rear wheel 3 in the vehicle width direction. The pulser ring 61 is disposed on the right side of the rear disk brake 46 in the vehicle width direction. The pulser ring 61 is disposed inside the rear disk brake 46 in the radial direction. The pulser ring 61 is disposed concentrically with the rear wheel 3. A plurality of pickup holes are formed in the pulser ring 61 in the circumferential direction at substantially equal intervals.

The pickup sensor 62 is installed behind the discharge port 57 and in front of the second brake caliper 47B. The pickup sensor 62 is supported by the second rear caliper support section 59 of the drive unit 55. The pickup sensor 62 includes a pickup coil (not shown) configured to generate a pulse signal due to a variation in magnetic flux according to the rotation of the pulser ring 61.

One end portion (a rear end portion) of a sensor cord 63 for a rear wheel is connected to the pickup sensor 62. The other end portion of the sensor cord 63 for a rear wheel is connected to a control unit (not shown).

Accordingly, a pulse signal generated by the pickup coil is output to the control unit. For example, the pulse signal is used for detection of a slip ratio of the rear wheel 3, detection of a vehicle speed, and so on.

The sensor cord 63 for a rear wheel extends forward from the pickup sensor 62 along the drive unit 55, and is held by a clamp 67 of a front lower section of the drive unit 55. Also, the sensor cord 63 for a rear wheel extends toward the control unit (not shown).

<Guide>

Figure 2:
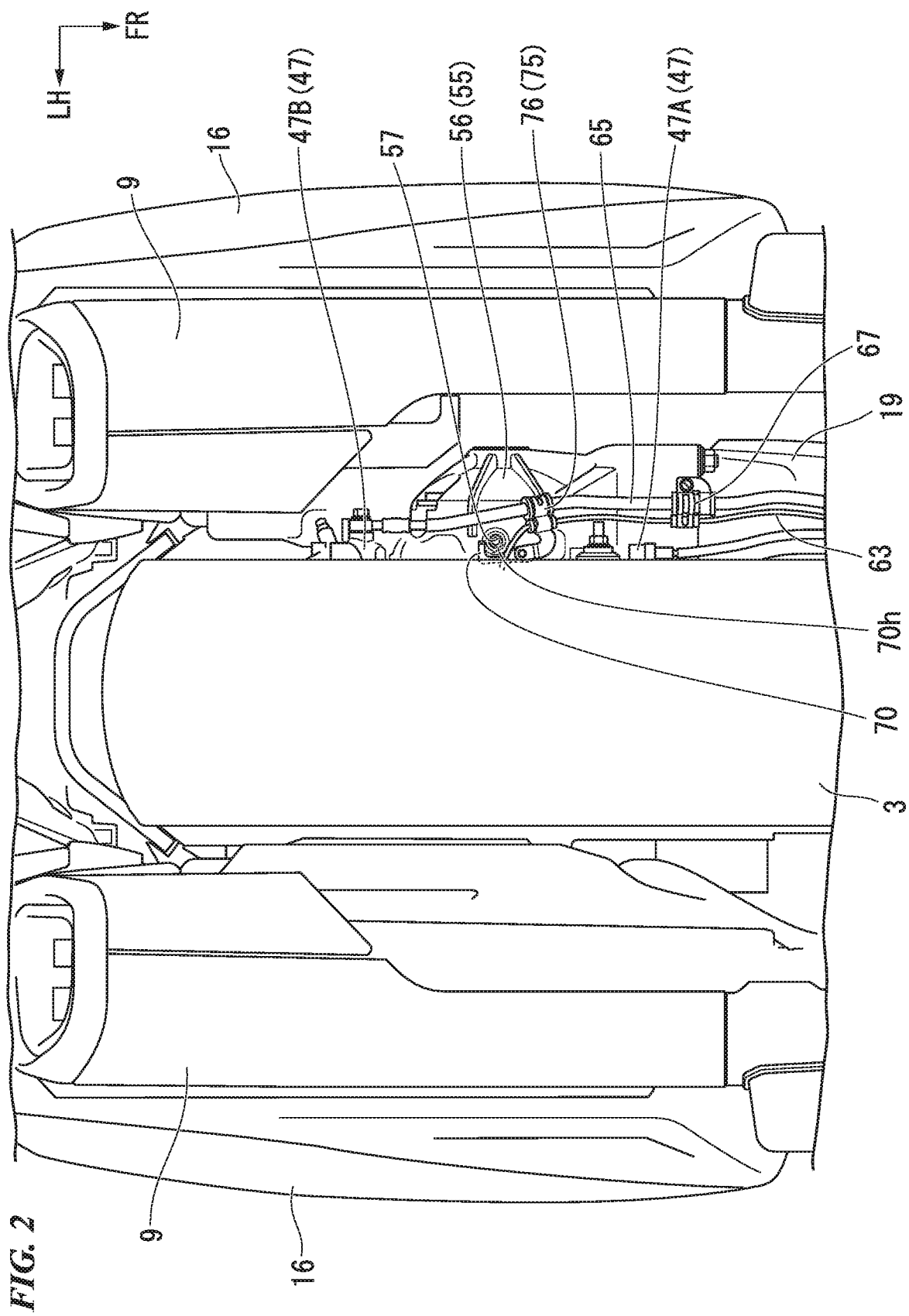
FIG. 2 is a bottom view of a vehicle rear section of the motorcycle.

As shown in FIG. 2, a guide 70 configured to guide oil to the outside in the vehicle width direction is installed in the vicinity of a lower section of the discharge port 57 in a lower section of the drive unit 55. In the bottom view of FIG. 5, an opening section 70h configured to open the discharge port 57 downward is installed in the guide 70.

Figure 6:
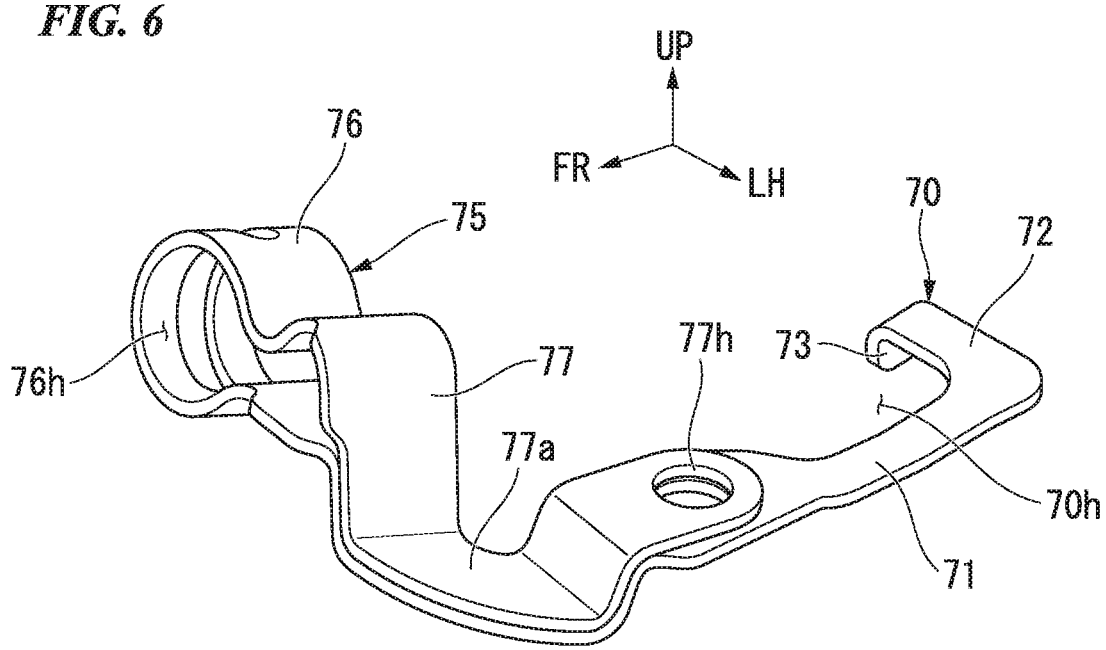
FIG. 6 is a perspective view of a guide according to an embodiment of the present invention as viewed from a left upper side.

As shown in FIG. 6, the guide 70 is installed integrally with a support section 75 that can support a cable body. The guide 70 and the support section 75 are integrally formed of the same member. For example, the guide 70 and the support section 75 are integrally formed by folding a sheet of a plate member such as a metal plate or the like.

Figure 7:
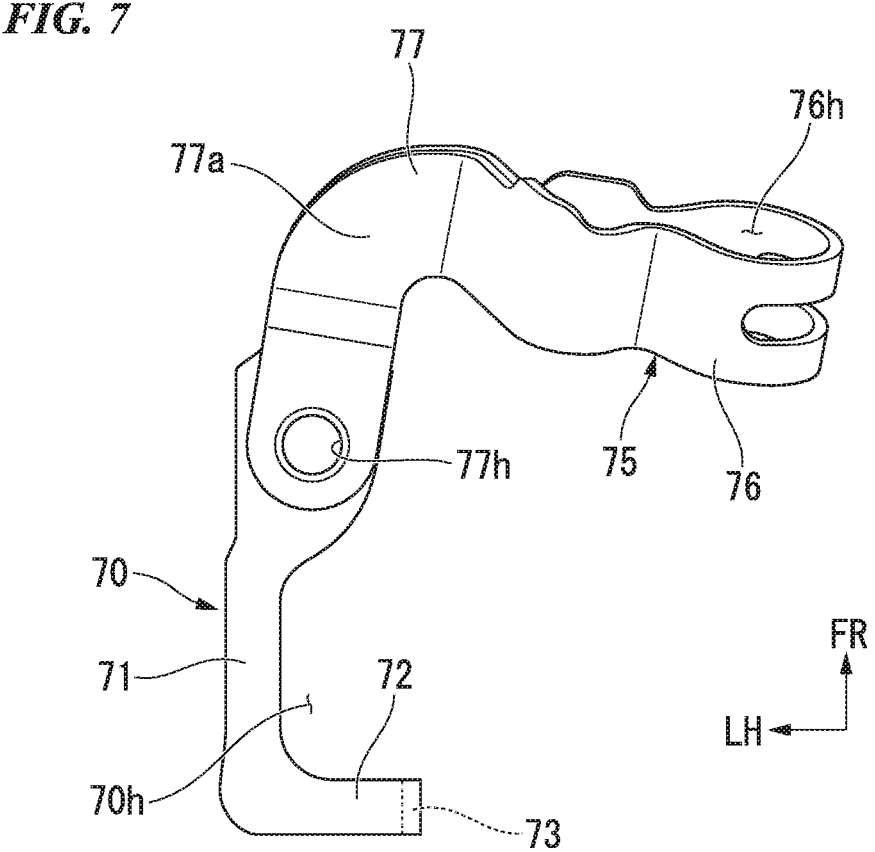
FIG. 7 is a plan view of the guide.

As shown in FIG. 7, the guide 70 includes a forward-rearward extension section 71 extending in the vehicle forward-rearward direction, an outward extension section 72 extending from a rear end of the forward-rearward extension section 71 toward the outside (a right side) in the vehicle width direction, and a downward extension section 73 extending downward from an outer end (a right end) of the outward extension section 72 in the vehicle width direction. In the plan view of FIG. 7, the forward-rearward extension section 71 and the outward extension section 72 form an L shape. The forward-rearward extension section 71 and the outward extension section 72 define the opening section 70h.

Figure 8:
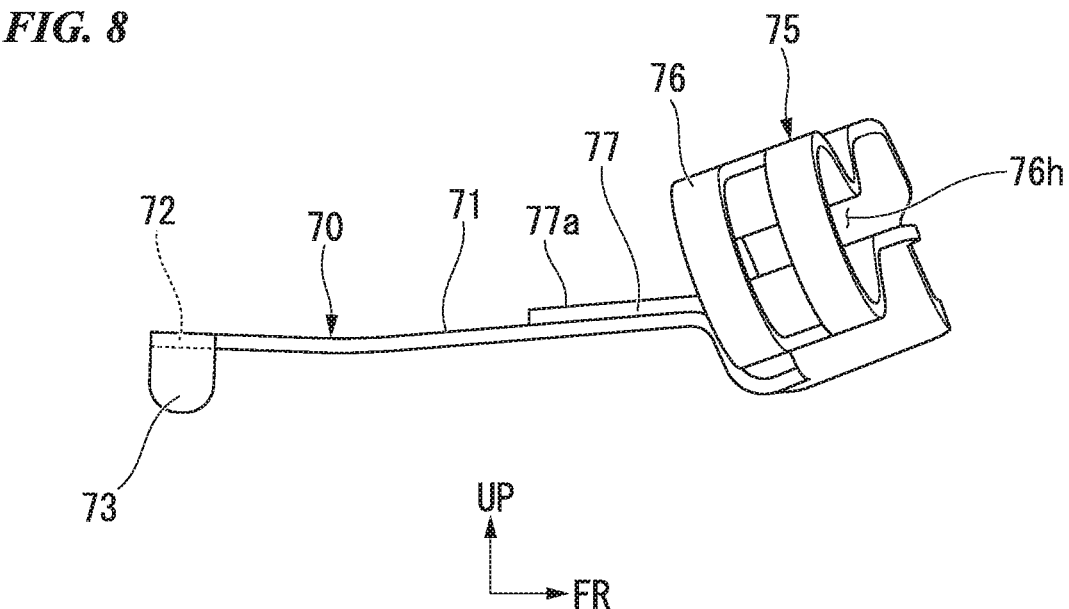
FIG. 8 is a right side view of the guide.
Figure 9:
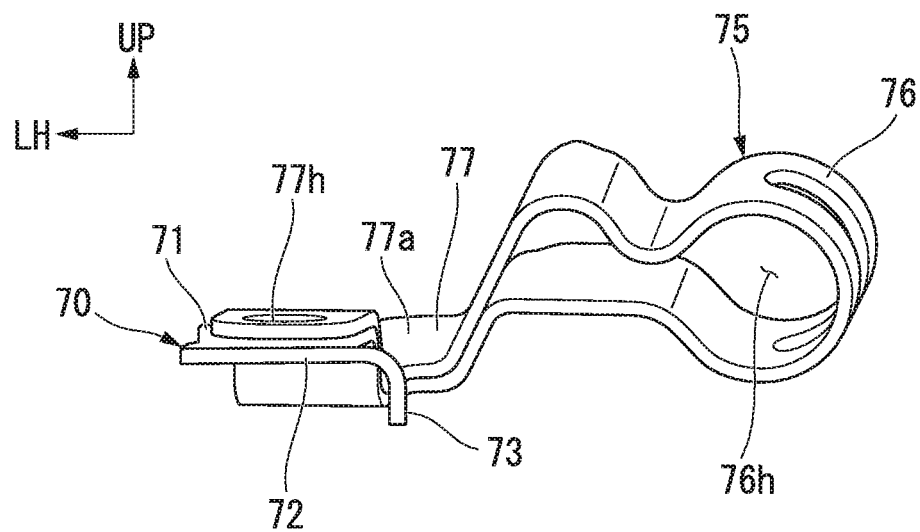
FIG. 9 is a rear view of the guide.

In the right side view of FIG. 8, the forward-rearward extension section 71 is gently inclined so as to be disposed downward as it goes rearward. In the rear view of FIG. 9, the outward extension section 72 extends substantially horizontally rightward from a rear end of the forward-rearward extension section 71. When seen in the rear view of FIG. 9, the downward extension section 73 is curved to form an arc shape from the right end of the outward extension section 72 and extends downward.

<Support Section>

As shown in FIG. 6, the support section 75 includes a support section main body 76 that can support a cable body, and a connecting section 77 that connects the support section main body 76 with the guide 70. As shown in FIG. 3, the support section 75 supports a brake hose 65 connected to the second rear brake caliper 47B as a cable body.

When seen in the right side view of FIG. 3, the brake hose 65 is formed in a slightly convex downward shape and extends forward and rearward below the exhaust muffler 9. For example, the brake hose 65 connects the second rear brake caliper 47B with the master cylinder for a rear wheel (not shown) via the ABS module 50 (see FIG. 1). When seen in the right side view of FIG. 3, the discharge port 57 is covered with the brake hose 65.

As shown in FIG. 7, the support section main body 76 is disposed further outside (a right side) than the outward extension section 72 in the vehicle width direction. When seen in the right side view of FIG. 8, the support section main body 76 is formed in a cylindrical shape inclined so as to be disposed downward as it goes rearward. An opening section 76h opening forward and rearward is formed in the support section main body 76. The opening section 76h has a size such that the cable body can be inserted therethrough.

As shown in FIG. 6, the connecting section 77 has an overlapping section 77a that is vertically overlapped by folding a sheet of a plate member. A through-hole 77h opening upward and downward is formed in a rear end portion of the connecting section 77.

Figure 5:
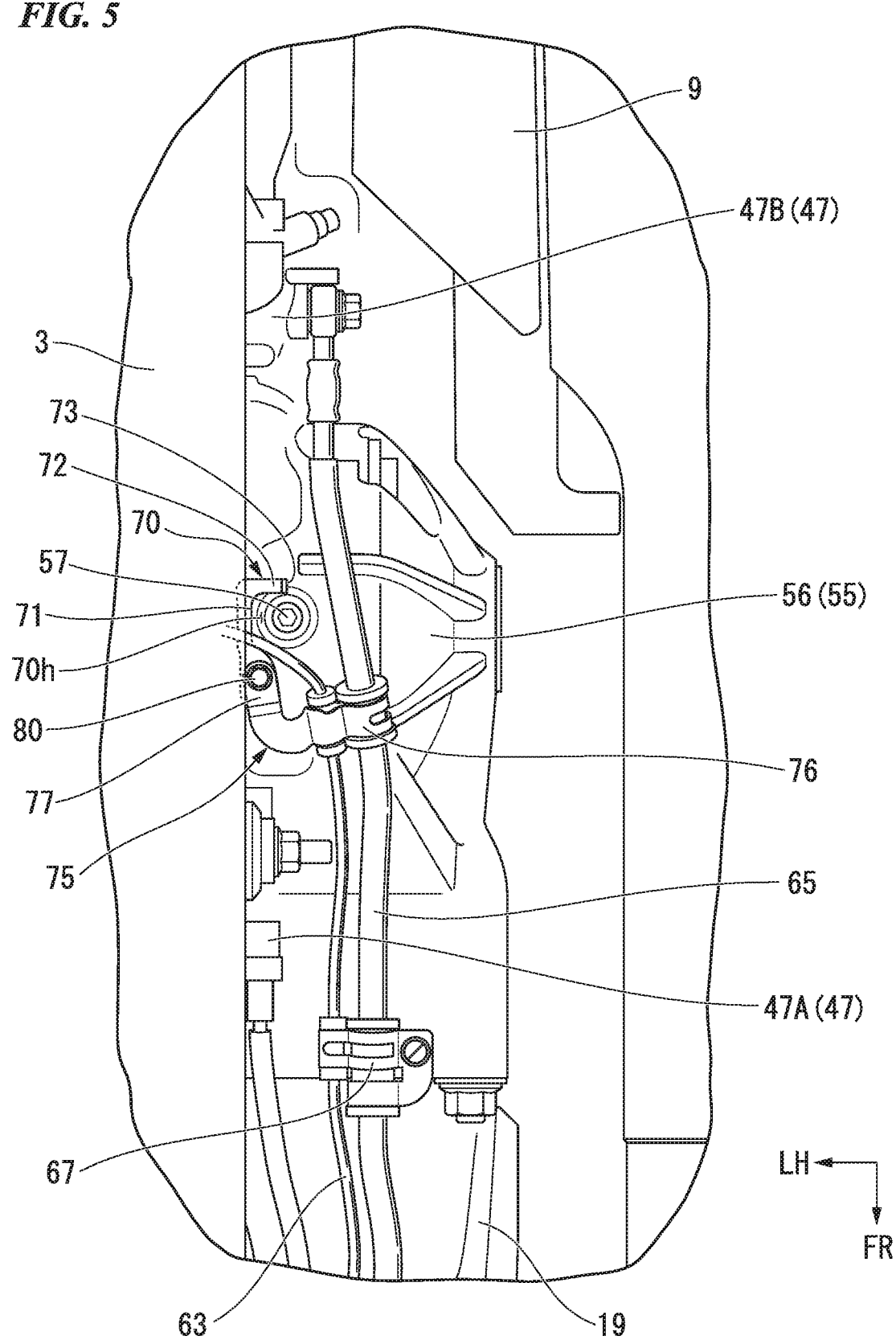
FIG. 5 is an enlarged view of a major part in FIG. 2.

As show in FIG. 5, the guide 70 and the support section 75 are fixed to a female thread section (not shown) of the drive unit case 56 by a bolt 80 (a fixing member). For example, a shaft section of the bolt 80 is inserted through the through-hole 77h (see FIG. 6) of the connecting section 77 and threadedly engaged with the female thread section of the drive unit case 56, and thus, the guide 70 and the support section 75 are fixed to the drive unit case 56. In the embodiment, the guide 70 is disposed behind the bolt 80. Meanwhile, the support section 75 is disposed in front of the bolt 80.

<Disposition of Guide and Support Section with Respect to Discharge Port>

When seen in the bottom view of FIG. 5, the forward-rearward extension section 71 of the guide 70 has a position disposed further inside than the discharge port 57 in the vehicle width direction and overlapping a side edge of the rear wheel 3 that extends forward and rearward. In the bottom view of FIG. 5, the outward extension section 72 of the guide 70 extends rightward from the rear end of the forward-rearward extension section 71 while bypassing the discharge port 57. When seen in the bottom view of FIG. 5, the connecting section 77 of the support section 75 is disposed in front of the discharge port 57. When seen in the bottom view of FIG. 5, the support section main body 76 of the support section 75 extends rightward from a right end of the connecting section 77 and is disposed further rightward than the discharge port 57.

<Action of Guide>

Figure 10:
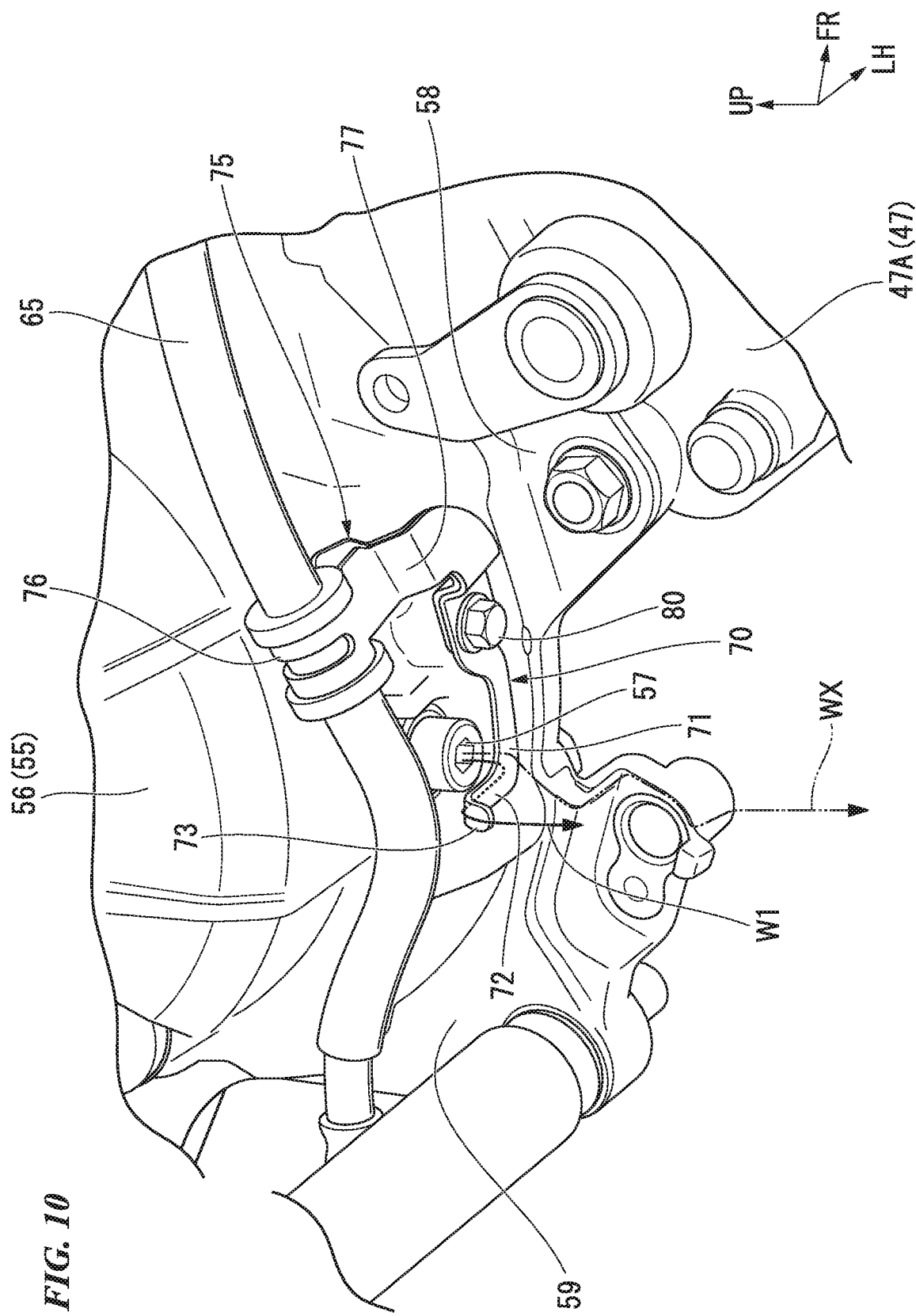
FIG. 10 is a view for explaining an action of the guide.

FIG. 10 shows an example of an inclined state of the vehicle. In the example of FIG. 10, a state in which the vehicle is inclined to a position at which the discharge port 57 and the rear wheel 3 overlap each other in the upward/downward direction (see FIG. 1) is shown. For example, the inclined state of the vehicle is a stopped state of the vehicle using a side stand or a state in which the vehicle is stopped using a center stand at a place where the ground surface is inclined.

For example, when the guide 70 of the embodiment is not provided (a comparative example), oil dropped from the discharge port 57 is guided downward along the second rear caliper support section 59 below the drive unit case 56 (see an arrow WX). For this reason, in the comparative example, oil dropped from the discharge port 57 is guided to the rear wheel 3 (see FIG. 1), and the oil cannot be directly dropped onto the ground surface in some cases.

On the other hand, according to the embodiment, the oil dropped from the discharge port 57 is guided to the outside in the vehicle width direction by the guide 70. Specifically, when the oil dropped from the discharge port 57 strikes the forward-rearward extension section 71, the oil is guided to the outside in the vehicle width direction by the outward extension section 72 along the forward-rearward extension section 71, and guided downward along the downward extension section 73 (see an arrow W1). Accordingly, according to the embodiment, the oil dropped from the discharge port 57 can be directly dropped onto the ground surface without being guided to the rear wheel 3 (see FIG. 1).

As described above, in the embodiment, in the motorcycle 1 in which the drive unit 55 used for driving of the rear wheel 3 is provided and the discharge port 57 for oil is installed on the lower section of the drive unit 55, the guide 70 configured to guide oil to the outside in the vehicle width direction is installed in the vicinity of the lower section of the discharge port 57.

According to the configuration, since the oil dropped from the discharge port 57 is guided to the outside in the vehicle width direction by the guide 70 as the guide 70 configured to guide the oil to the outside in the vehicle width direction is installed in the vicinity of the lower section of the discharge port 57, the oil in the motorcycle 1 can be reliably guided to the ground surface.

In addition, in the embodiment, in the bottom view, since the oil can be directly dropped onto the ground surface via the opening section 70h as the opening section 70h configured to open the discharge port 57 downward is formed in the guide 70, the guide 70 is not contaminated and which is preferable. In addition, a material cost of the guide 70 can be reduced by the opening section 70h.

In addition, in the embodiment, in comparison with the case in which the guide 70 is formed separately from the support section 75, as the guide 70 is formed integrally with the support section 75 that can support the cable body, the number of parts can be reduced and costs can be minimized.

In addition, in the embodiment, since the guide 70 includes the forward-rearward extension section 71 extending in the vehicle forward-rearward direction, the outward extension section 72 extending from one end of the forward-rearward extension section 71 toward the outside in the vehicle width direction and the downward extension section 73 extending downward from the outer end of the outward extension section 72 in the vehicle width direction, when the oil dropped from the discharge port 57 strikes the forward-rearward extension section 71, the oil is guided to the outside in the vehicle width direction by the outward extension section 72 along the forward-rearward extension section 71 and guided downward along the downward extension section 73. Accordingly, the oil can be reliably guided to the ground surface along the forward-rearward extension section 71, the outward extension section 72 and the downward extension section 73.

In addition, in the embodiment, since the support section 75 includes the support section main body 76 that can support the cable body further outside than the outward extension section 72 in the vehicle width direction, the cable body supported by the support section main body 76 can be prevented from coming in contact with the outward extension section 72.

In addition, in the embodiment, since the guide 70 and the support section 75 are fixed to the drive unit case 56 by a single bolt 80, the guide 70 is disposed behind the bolt 80 and the support section 75 is disposed in front of the bolt 80, the guide 70 and the support section 75 can be fixed by the single bolt 80 with good balance in the forward-rearward direction. In addition, in comparison with the case in which the guide 70 and the support section 75 are fixed by a plurality of bolts 80, the number of parts can be reduced and costs can be minimized.

In addition, in the embodiment, since the first rear brake caliper 47A disposed in front of the discharge port 57 and installed on the lower section of the drive unit 55 and the second rear brake caliper 47B disposed behind the discharge port 57 and installed on the rear section of the drive unit 55 are provided and the support section 75 supports the brake hose 65 connected to the second brake caliper 47B as the cable body, the guide 70 can be optimally disposed in the vehicle in which the mounting space is limited.

In addition, in the embodiment, since the pickup sensor 62 installed behind the discharge port 57 and in front of the second brake caliper 47B and configured to detect a rotating speed of the rear wheel 3 is provided, the guide 70 can be more optimally disposed in the vehicle in which the mounting space is further limited.

In addition, in the embodiment, when seen in a side view, since the discharge port 57 is hidden as the discharge port 57 is covered with the brake hose 65, appearance characteristics can be improved.

Further, while the example in which the driving wheel is the rear wheel 3 has been described in the embodiment, there is no limitation thereto. For example, the driving wheel may be the front wheel 2.

In addition, while the example in which the front fork is the front swing arm that constitutes the front suspension mechanism has been described in the embodiment, there is no limitation thereto. For example, the front fork may be a telescopic-type front fork suspension (a front fork).

In addition, while the example in which the hydraulic pressure supply unit is the master cylinder has been described in the embodiment, there is no limitation thereto. For example, the hydraulic pressure supply unit may be a hydraulic pressure supply mechanism such as a hydraulic pressure cylinder or the like, other than the master cylinder. That is, the hydraulic pressure supply unit may be a unit configured to supply a brake pressure to the brake caliper.

In addition, while the example in which the brake hose 65 is the brake hose configured to connect the brake caliper and the master cylinder via the ABS module 50 has been exemplarily described in the embodiment, there is no limitation thereto. For example, the brake hose 65 may be a brake hose configured to connect the brake caliper and the hydraulic pressure supply unit not via the ABS module 50.

In addition, while the example in which the opening section 70h configured to open the discharge port 57 downward is formed in the guide 70 when seen in a bottom view has been exemplarily described in the embodiment, there is no limitation thereto. For example, the opening section 70h may not be formed in the guide 70. For example, the guide 70 may cover the discharge port 57 from below. That is, the guide 70 may be installed in the vicinity of the lower section of the discharge port 57 and may have a function of guiding oil to the outside in the vehicle width direction.

In addition, while the example in which the guide 70 includes the forward-rearward extension section 71 extending in the vehicle forward-rearward direction, the outward extension section 72 extending from one end of the forward-rearward extension section 71 toward the outside in the vehicle width direction and the downward extension section 73 extending downward from the outer end of the outward extension section 72 in the vehicle width direction has been described in the embodiment, there is no limitation thereto. For example, the guide 70 may be a plate-shaped member inclined so as to be disposed downward as it goes outward in the vehicle width direction. That is, the guide 70 may employ various shapes as long as a function of guiding oil to the outside in the vehicle width direction is provided.

In addition, while the example in which the guide 70 is disposed behind the bolt 80 and the support section is disposed in front of the bolt 80 has been exemplarily described in the embodiment, there is no limitation thereto. For example, the guide 70 may be disposed in front of the bolt 80 and the support section may be disposed behind the bolt 80. That is, the guide 70 may be disposed on one side with respect to the bolt 80 in the vehicle forward-rearward direction and the support section may be disposed on the other side with respect to the bolt 80 in the vehicle forward-rearward direction.

In addition, while the example in which the guide 70 and the support section 75 are fixed by the single bolt 80 has been described in the embodiment, there is no limitation thereto. For example, the guide 70 and the support section 75 may be fixed by a plurality of bolts 80.

In addition, while the example in which the fixing member is the bolt 80 (a fastening member) has been exemplarily described in the embodiment, there is no limitation thereto. For example, fixing member may be another member such as a rivet, a clip, and the like.

In addition, while the example in which the guide 70 and the support section 75 are integrally formed of the same member has been exemplarily described in the embodiment, there is no limitation thereto. For example, the guide 70 and the support section 75 may be formed of different members and may be coupled by welding or the like.

In addition, while the example in which the discharge port 57 is covered with the brake hose 65 when seen in the side view has been exemplarily described in the embodiment, there is no limitation thereto. The discharge port 57 may be covered with a cable body such as a hose, a harness, or the like, other than the brake hose 65. Alternatively, the discharge port 57 may be exposed from the brake hose 65 when seen in the side view.

In addition, while the case in which the engine is the horizontal multi-cylinder engine has been exemplarily described in the embodiment, there is no limitation thereto. For example, the engine may be a parallel multi-cylinder engine or a single cylinder engine. That is, the engine may employ various types.

Further, the present invention is not limited to the embodiment, and for example, all vehicles on which a driver straddles and rides on the vehicle body are included as the straddle-type vehicle, and in addition to a motorcycle (including a motorized bicycle and a scooter type vehicle), a three-wheeled vehicle (also including a two-front-wheeled and one-rear-wheeled vehicle in addition to a one-front-wheeled and two-rear-wheeled vehicle) may also be included. In addition, the present invention may also be applied to a four-wheeled vehicle such as an automobile or the like in addition to a motorcycle.

While a preferred embodiment of the invention has been described and illustrated above, it should be understood that this is exemplary of the invention and is not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A straddle-riding vehicle comprising a drive unit used for driving a driving wheel of the straddle-riding vehicle,
   wherein a discharge port that discharges oil in the drive unit is installed on a lower section of the drive unit,
   a guide that guides the oil to an outside in a vehicle width direction is installed in a vicinity of a lower section of the discharge port,
   the guide is formed integrally with a support section that is able to support a cable body, and
   the guide comprises:
      a forward-rearward extension section extending in a vehicle forward-rearward direction;
      an outward extension section extending outward from one end of the forward-rearward extension section in the vehicle width direction; and
      a downward extension section extending downward from an outer end of the outward extension section in the vehicle width direction.

2. The straddle-riding vehicle according to claim 1, wherein, when seen in a bottom view, an opening section that opens the discharge port downward is formed in the guide.

3. The straddle-riding vehicle according to claim 1, wherein the support section comprises a support section main body that supports the cable body further outward than the outward extension section in the vehicle width direction.

4. The straddle-riding vehicle according to claim 1, wherein the guide and the support section are fixed to a drive unit case of the drive unit by a single fixing member,
   the guide is disposed on one side with respect to the fixing member in the vehicle forward-rearward direction, and
   the support section is disposed on the other side with respect to the fixing member in the vehicle forward-rearward direction.

5. The straddle-riding vehicle according to claim 1, further comprising:
   a first brake caliper disposed in front of the discharge port and installed on the lower section of the drive unit; and
   a second brake caliper disposed behind the discharge port and installed on a rear section of the drive unit, wherein the support section supports a brake hose connected to the second brake caliper as the cable body.

6. The straddle-riding vehicle according to claim 5, further comprising a wheel speed sensor installed behind the discharge port and in front of the second brake caliper and that detects a rotating speed of the driving wheel.

7. The straddle-riding vehicle according to claim 1, wherein, when seen in a side view, the discharge port is covered with the cable body.

* * * * *